United States Patent [19]
Verrier

[11] Patent Number: 6,156,168
[45] Date of Patent: Dec. 5, 2000

[54] ELECTROLYTIC DEVICE

[75] Inventor: Michael Fletcher Verrier, Stockton, Calif.

[73] Assignees: Paul Kayfetz; Monique Yamauchi, both of Bolinas, Calif.

[21] Appl. No.: 09/270,290

[22] Filed: Mar. 16, 1999

[51] Int. Cl.[7] ............................... C25B 9/00; C25B 11/00
[52] U.S. Cl. ..................... 204/272; 204/275; 204/290 F
[58] Field of Search ................................. 204/272, 275, 204/225, 290 F

[56] References Cited

U.S. PATENT DOCUMENTS

| | | |
|---|---|---|
| 2,546,254 | 3/1951 | Briggs . |
| 3,984,303 | 10/1976 | Peters . |
| 4,014,777 | 3/1977 | Brown . |
| 4,113,601 | 9/1978 | Spirig . |
| 4,121,991 | 10/1978 | Miller . |
| 4,169,035 | 9/1979 | Stummer . |
| 4,426,261 | 1/1984 | Fushihara . |
| 4,612,104 | 9/1986 | Holmes . |
| 4,676,882 | 6/1987 | Okazaki . |
| 6,054,026 | 4/2000 | Van den Bergen et al. ....... 204/272 X |

*Primary Examiner*—Donald R. Valentine
*Attorney, Agent, or Firm*—Thomas M. Freiburger

[57] ABSTRACT

A water treatment device using a known electrolytic principle includes a pair of inner and outer concentric truncated cones serving as electrodes and providing an annular flow space for generally axial flow of liquid to be decomposed or dissociated. The flow in a preferred embodiment is from the smaller-diameter end of the cone-shaped flow space to the larger-diameter end, thus decreasing pressure; however, in certain electrolytic reactions increasing pressure is an advantage, thus the device has bidirectional flow capability. The shape of all interior components along the flow path is such as to provide smooth transitions to avoid turbulence or cavitation in the liquid flow. The two cones can be shifted relatively along an axis line so as to change the width of the annular flow space. The two electrode-cones are advantageously formed of coated titanium plates. Important features of the device include the manner of mounting the inner cone/electrode within the outer cone, which provides for sliding, relative axial movement of the two cones to adjust the size of the flow path, and this may be dynamically, during use. Features may be included to maximize the surface area of the electrodes exposed to the liquid.

13 Claims, 6 Drawing Sheets

ELECTROLYTIC DEVICE

BACKGROUND OF THE INVENTION

This invention concerns electrolysis of water-borne slurries, suspensions and solutions for treatment of the water, either for purification or other purposes. More specifically, the invention is directed to a specific configuration of electrolytic device through which liquid can flow on a continuous basis for treatment by electrolysis.

The effects of electrolysis on water and water-borne substances are well known. This includes processes for the complete breakdown of water into elemental hydrogen and oxygen gas, as well as other electrolytic processes such as to divide water into alkaline and acidic components, to produce halogen gases, and to purify water. See, as examples, the following U.S. Pat. Nos.: 2,546,254 (Briggs); 3,984,303 (Peters); 4,014,777 (Brown); 4,113,601 (Spirig); 4,121,991 (Miller): 4,169,035 (Stummer); 4,426,261 (Fushihara); 4,612,104 (Holmes); 4,676,882 (Okazaki). The use of electrolysis in purification of water and aqueous solutions and suspensions involves the precipitation of impurities, possibly due in part to production of atomic oxygen in the electrolytic process, the atomic oxygen existing only for a very short time before combining with impurities.

The Peters patent referenced above, disclosing a tubular electrolytic device through which aqueous solutions flow generally axially, is concerned with the production of halogen gas and alkali metal hydroxides. The patent describes a hollow tubular cathode member with a hollow tubular anode member positioned concentrically within the cathode. The two electrodes have liquid permeable walls. An outer shell surrounds the cathode member, rather than the cathode itself providing the liquid-containing housing.

The Spirig patent shows a water decomposing electrolytic device which involves cone-shaped compartment structures arranged concentrically, but those shapes are dictated by construction considerations rather than by flow considerations. The flow of liquid in the Spirig patent is very different from that of the present invention. The Miller patent describes an electrolytic cell for water purification, the water flowing axially through the cylindrical device but not in the manner or with the flow structure of the present invention. In the different embodiments described by Miller, at least one of the electrodes is provided by blade-like radially arranged components within the cylindrical shell.

The Stummer patent shows an axial-flow electrolytic cell for treatment of aqueous solutions wherein the liquid flows between generally concentric electrodes. Concentric cones are shown in an embodiment disclosed by Stummer, but not concentric cone-shaped electrodes both of which confine the flowing liquid during electrolytic treatment. The patent is primarily concerned with avoiding the formation of deposits on the electrodes, particularly the cathode.

Fushihara shows another concentric cylindrical arrangement in an electrolytic device. Holmes describes an electrolytic cell which includes concentric inner and outer electrodes and in which the inner electrode has some conical portions. The aqueous solution flows axially between the electrodes, but inflow and outflow are not axial but radial. The patent is concerned with variation in flow cross section, for controlling the deposition of salts into preferred areas.

The Okazaki patent shows another concentric-cylinder electrolytic device, in which influent and outflow are not axial.

It is among the objects of this invention to improve continuous-flow electrolytic cells used in treatment of aqueous solutions, in efficiency of construction and electrolytic operation.

SUMMARY OF THE INVENTION

This invention provides an improved electrolytic device for treatment of water and aqueous solutions, using known electrolytic principles but in a highly efficient continuous flow, axial flow electrolytic cell. In preferred embodiments the apparatus includes pair of inner and outer concentric truncated cones serving as electrodes and providing an annular flow space for generally axial flow of liquid to be decomposed or dissociated. The flow in a preferred embodiment is from the smaller-diameter end of the cone-shaped flow space to the larger-diameter end, thus decreasing pressure; however, in certain electrolytic reactions increasing pressure is an advantage, thus the device has bidirectional flow capability. The shape of all interior components along the flow path is such as to provide smooth transitions to avoid turbulence or cavitation in the liquid flow. The two cones can be shifted relatively along an axis line so as to change the width of the annular flow space.

The two electrode-cones are advantageously formed of coated titanium plates. Important features of the device include the manner of mounting the inner cone/electrode within the outer cone, providing for relative axial sliding movement of the two cones to adjust the size of the flow path; this may be dynamically, during use. Features may be included to maximize the surface area of the electrodes exposed to the liquid.

In one preferred embodiment of the invention a device for electrolytic treatment of liquid comprises a pair of metal cones comprising electrodes, including an outer cone and an inner cone having a common axis and being concentrically arranged with the inner cone positioned within the outer cone. The two cones define an annular flow space of increasing diameter from a first, smaller-diameter end of the device to a second, larger-diameter end of the device, such that liquid can flow through the annular space generally axially in either direction between the first and second ends, at high flow efficiency. The device includes securing means for mounting the inner cone within the outer cone, including conductive terminal means providing a conductive electrical path to the inner metal cone electrode, and including a first exterior terminal for connection of a power lead. A second exterior terminal is connected to the outer metal cone. The device also includes adjustment means associated with the securing means, for permitting adjustment of the inner metal cone relative to the outer metal cone by sliding movement along the axis of the two cones, to increase or decrease the size of the annular space between the cones.

The outer cone is covered with a plastic casing for protection, rigidity and insulation. This casing may be formed of polyvinyl chloride (PVC).

In one specific embodiment one or both of the cones has a convoluted surface to thereby increase liquid surface contact area as the liquid flows through the device.

The concentric cones have walls that parallel each other, i.e. the cones have the same cone angle. However, in one embodiment the two angles differ slightly so that the space between cones converges toward one end.

Accordingly, it is among the objects of the invention to improve on continuous-flow electrolytic cells for the treatment of aqueous solutions, in simplicity of construction, in flow efficiency and in the degree to which the liquid is treated. These and other objects, advantages and features of the invention will be apparent from the following description of a preferred embodiment, considered along with the accompanying drawings.

DESCRIPTION OF PREFFERED EMBODIMENTS

Figure 1:
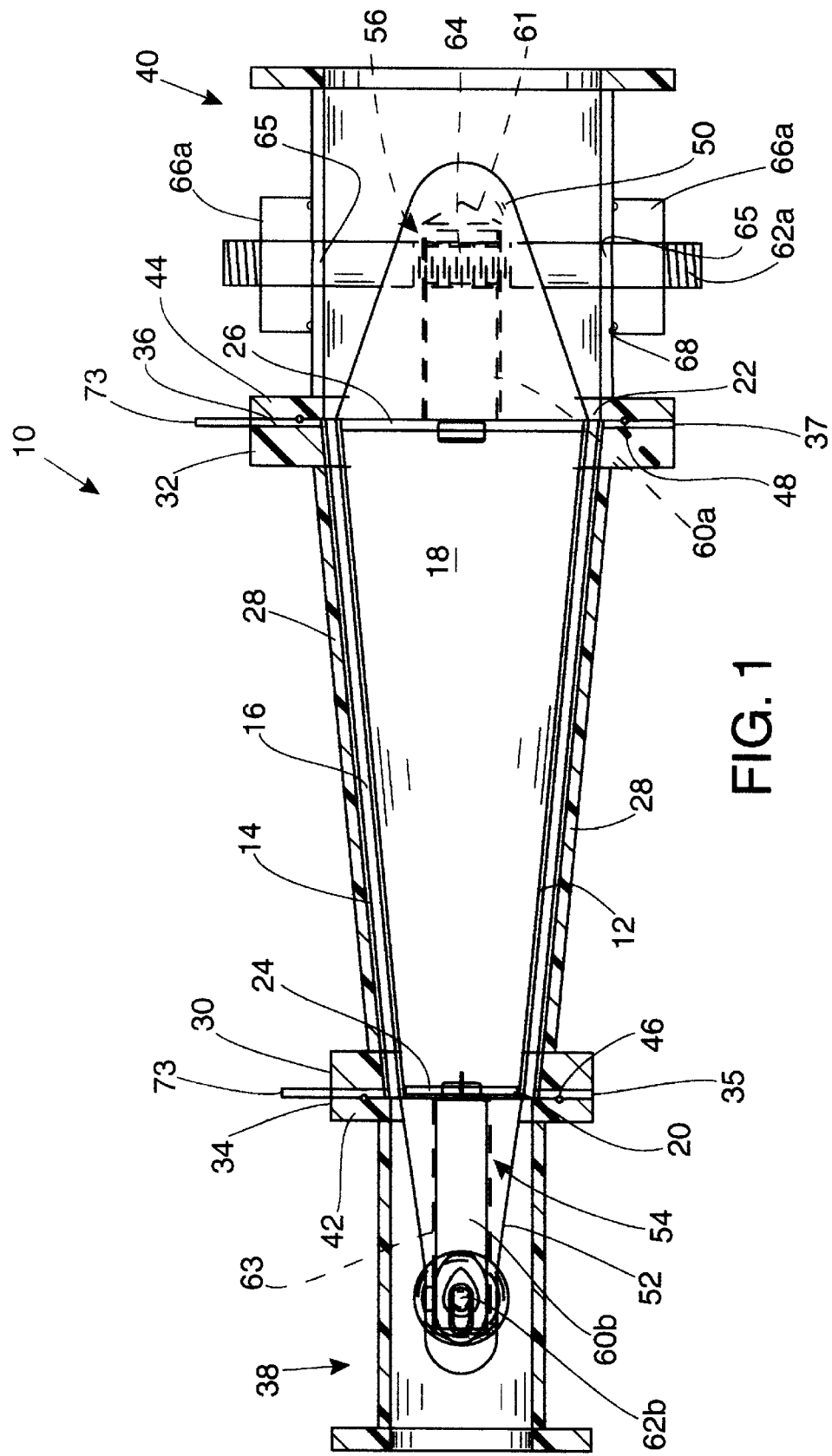
FIG. 1 is a sectional side view showing an electrolytic device according to the invention.
Figure 2:
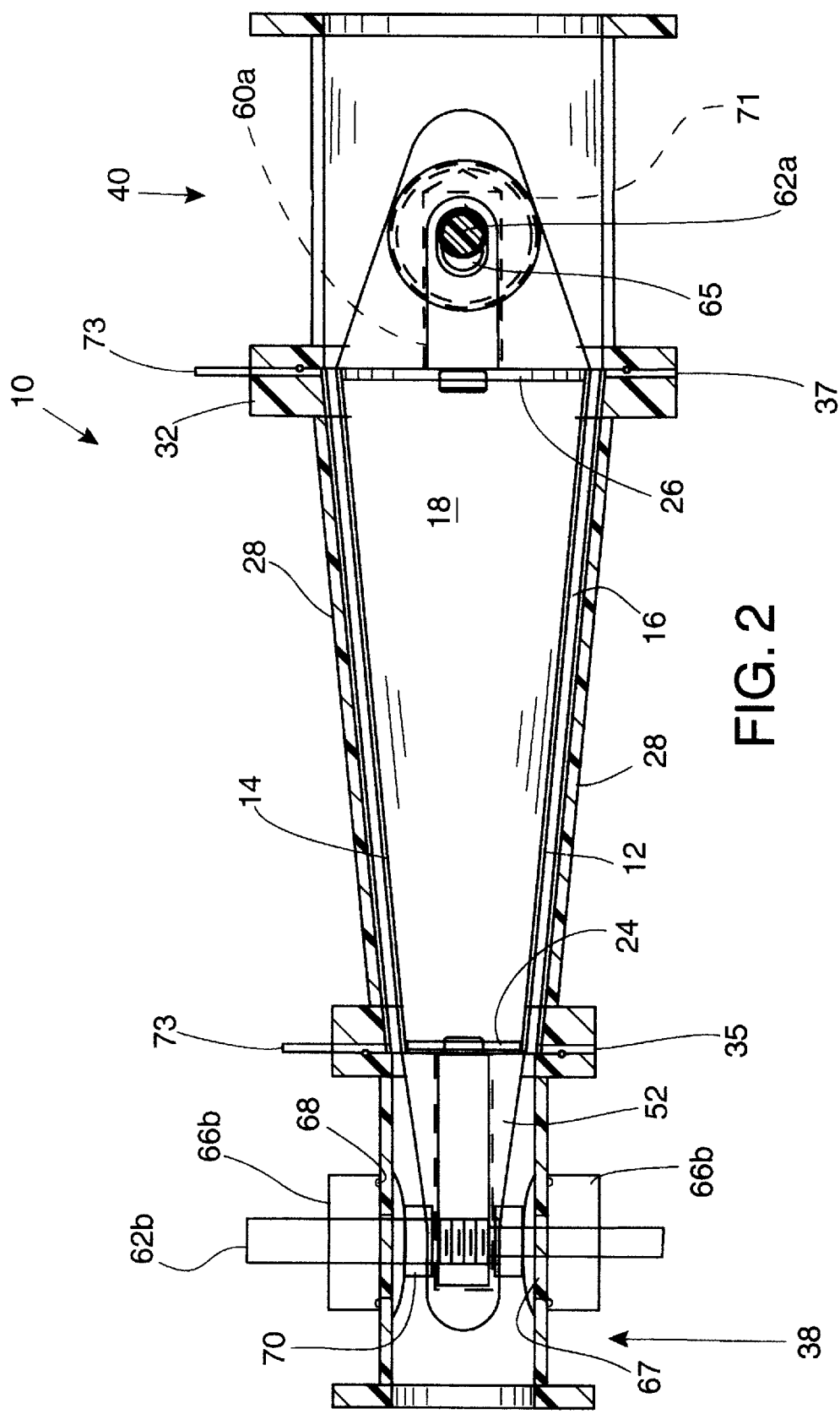
FIG. 2 is a sectional view of the device of FIG. 1, as seen at a 90°-rotated position.
Figure 6:
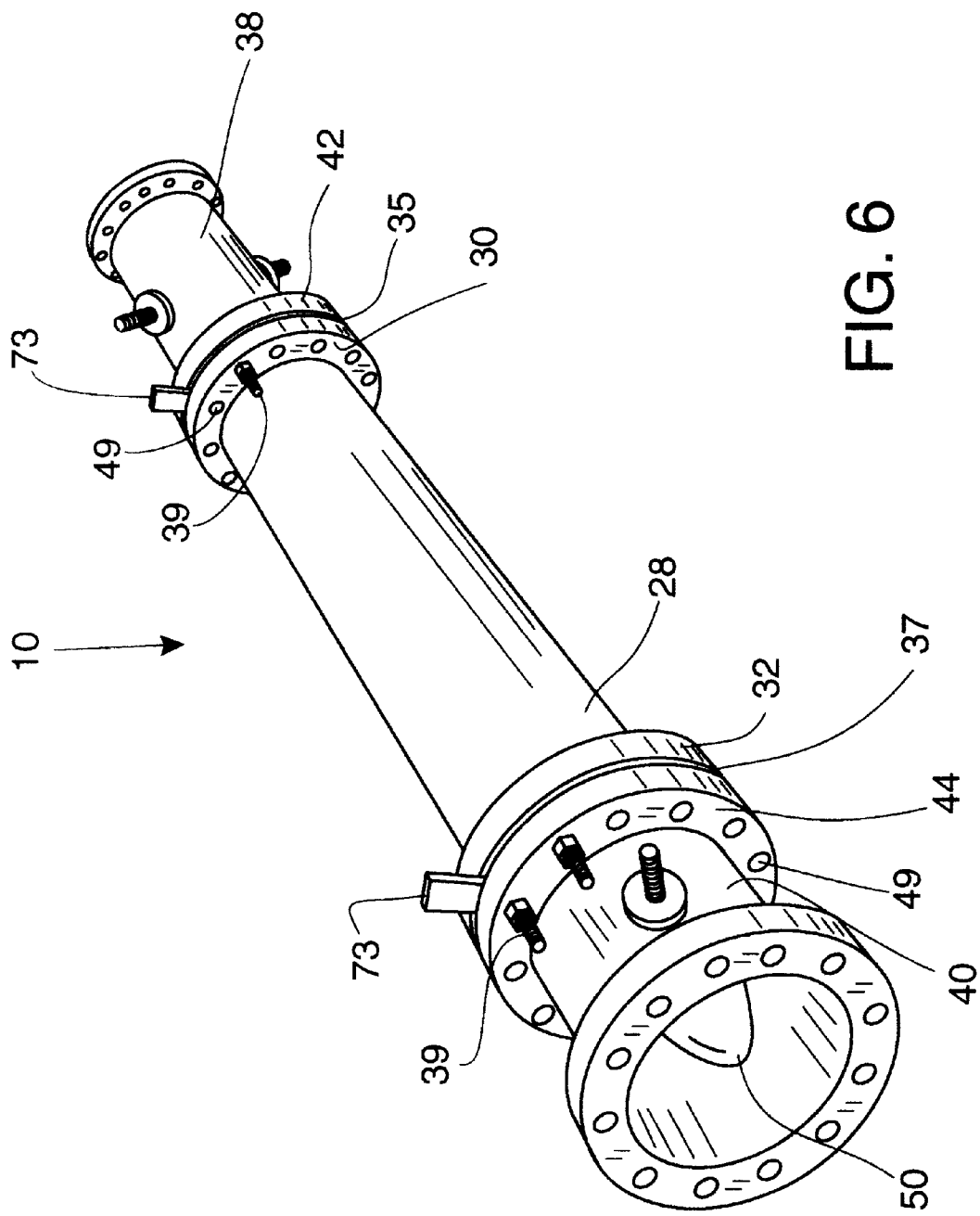
FIG. 6 is an external perspective view of the assembled electrolytic device.

FIG. 1 shows an embodiment of the invention in section, in what can be considered side elevation, although rotational orientation during operation is not important. FIG. 2 shows the same device in section from a 90°-rotated position, which can be considered a plan view. FIG. 6 shows the assembly in perspective, with FIG. 7 revealing the device in exploded view.

The device 10 of this embodiment has an inner metal cone 12 comprising one electrode and an outer, concentrically arranged metal cone 14 comprising a second electrode, the two electrodes defining an annular liquid flow space 16 through which the liquid to be treated can flow either to the right or to the left as viewed in FIGS. 1 and 2. The inner cone 12 may have a hollow interior 18 which is sealed off in the assembled electrolytic device 10. The ends of the cones 12 and 14 are at 20 and 22, and the word "cone" as used herein is intended to include a truncated cone as depicted. FIGS. 1 and 2 show that the inner cone 12 has closing end discs 24 and 26, which may be welded or otherwise secured to the relatively thin metal of the cone 12. Both the inner and outer cones 12 and 14 may be formed of titanium, grade A, preferably coated with iridium, platinum, rufinium or other coating metals depending on the particular liquid being processed and the involved chemical reactions. These metals are good electrical conductors and the particular coating metal is important in promoting certain electrolytic chemical reactions.

Figure 3:
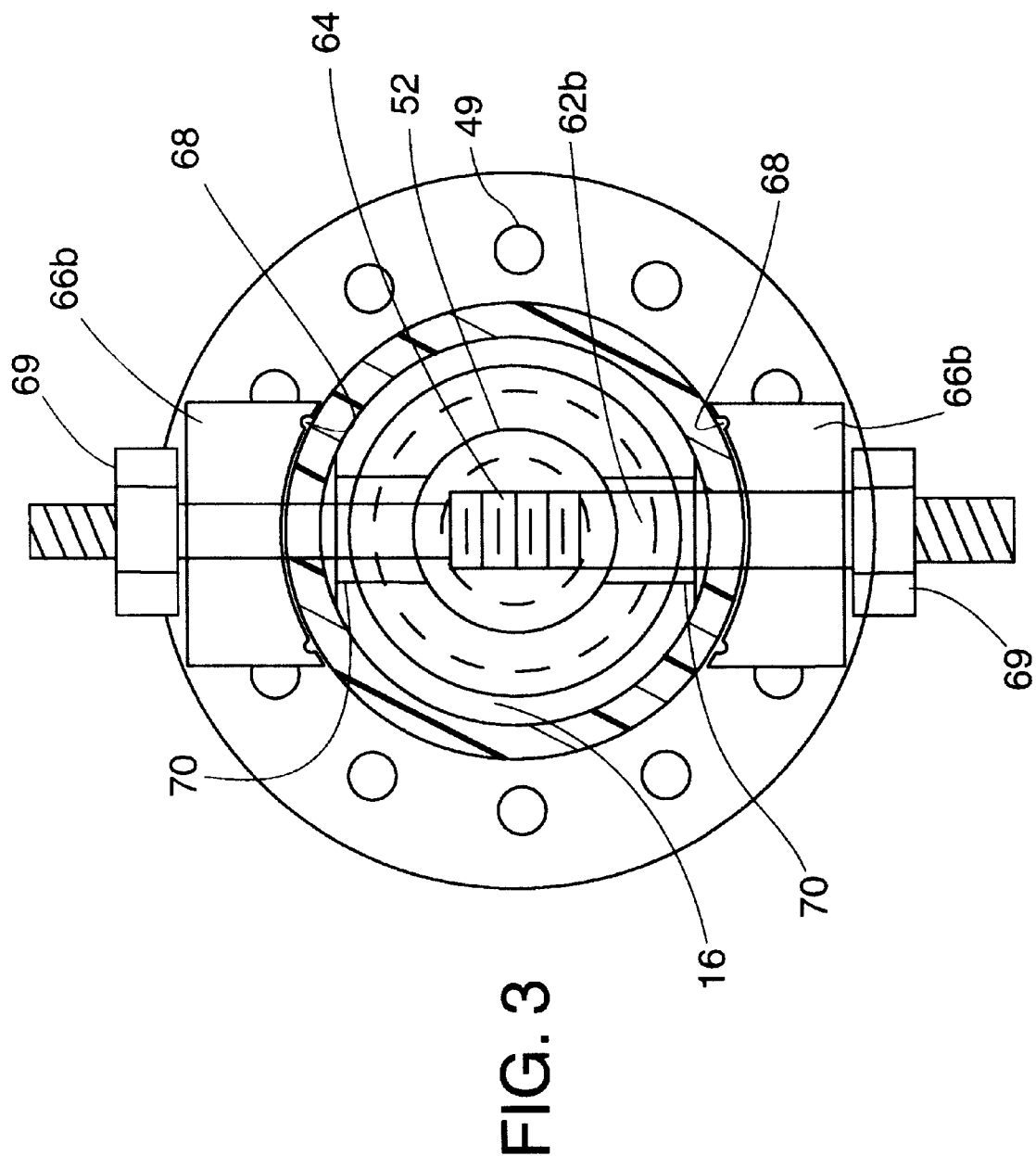
FIG. 3 is a sectional view, again from the opposite end, as seen generally along the line 6—6 in FIG. 2.

As shown in the drawings, the outer electrode cone 14 is covered with a jacket or housing 28, preferably closely fitted over the cone, providing added rigidity to the outer cone and isolating the electrode. This conical jacket 28, preferably of rigid plastic material such as polyvinyl chloride, has integral annular end plates 30 and 32 secured to the electrode cone 14 in sealed relationship. These end plates 30 and 32 have annular faces 34 and 36 which are in close contact with an annular titanium disc or flange 35 (small end) or 37 (large end), each of which is welded to a respective end of the outer cone 14. Connecting inflow/outflow conduits 38 and 40 are secured in sealed relationship against the flanges 35, 37 as shown, with through bolts 39 (FIG. 6; only a few shown) securing together three flanges at each end: flanges 30, 35 and an end plate 42 of the conduit 38 at the small end; and flanges 32, 37 and an end plate 44 of the conduit 40 at the large end. The end plates 42 and 44 of the conduits 38 and 40 preferably have annular grooves to seat elastomeric O-rings 46, 48 to seal against the titanium flanges 35, 37. The bolts 39 or other appropriate fasteners draw and hold the plates and flanges tightly together, compressing the O-rings 46 and 48. Bolt holes 49 are shown in FIGS. 3 and 6.

FIGS. 1 and 2 show that the device 10 also includes hydrodynamically designed nose and tail pieces 50 and 52, secured respectively to the larger end metal disk 26 at the larger-diameter end of the device and to the smaller end metal disk 24 at the smaller-diameter end. The terms "nose" and "tail" are used for convenience in describing the illustrated embodiment, and refer to one mode of operation wherein liquid flow is from right to left in FIGS. 1 and 2 (left to right in FIG. 6). However, liquid flow can be in the reverse direction, and this is desirable for certain applications, and thus the use of the terms nose and tail is not intended to be limiting, and these terms can be used interchangeably.

The hydrodynamic shape of the nose and tail pieces is important. The continuous-flow electrolytic cell 10 of the invention is an axial flow unit, and an important feature is the absence of sharp breaks, edges and other flow impedances which would cause appreciable turbulence. Where liquid flow is either to the left or right as viewed in FIGS. 1 and 2, the flow in through the inflow/outflow conduit 38 or 40 is smooth and substantially laminar, spread over the cone shape of the nose piece or tail piece 50 or 52, then through the annular flow space 16 between the inner and outer cone electrodes 12 and 14 toward the opposite end of the device where exit flow is again smooth.

Figure 5:
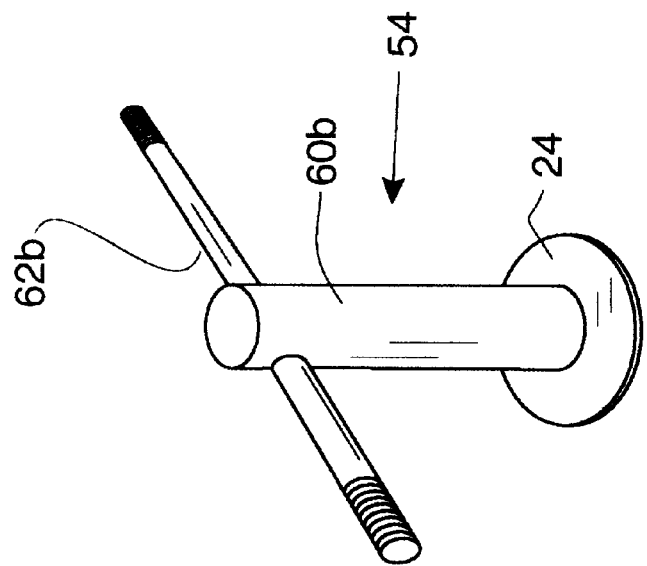
FIGS. 4 and 5 are perspective views showing subassemblies for the two ends of the inner cone of the device.
Figure 4:
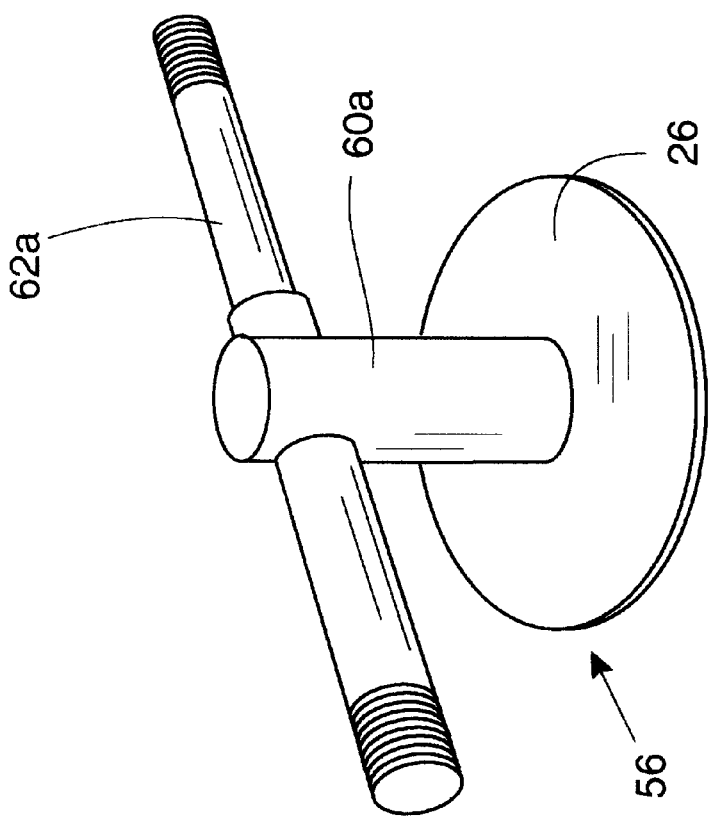

In one preferred embodiment the nose and tail pieces 50 and 52 are bonded onto titanium electrode conductors 54 and 56, which are seen in FIGS. 1 and 2 and also in FIGS. 4 and 5, where these components are indicated separately from the assembly. FIGS. 4 and 5 show that the titanium conductors 56 and 54 each include a conductive metal plate 26, 24, preferably of titanium as above, fixed to a rod 60a, 60b. The metal disks 24, 26 are shown in FIG. 1 as the end plates or discs at the two ends 20, 22 of the assembled inner cone electrode 12 and these disks are securely fixed in the ends of the truncated cone 12, preferably by welding. The conductive rods 60a, 60b have transverse openings near their ends through which extend electrode terminals 62a, 62b in the assembled device. The electrode terminals are retained in the rods 60a, 60b by threads 64 in a preferred embodiment.

The nose and tail pieces 50, 52 can be of plastic, such as PVC. Each has a central bore (as indicated at 61 and 63 in FIG. 1) that is slipped over the rod 60a, 60b before assembly of the transverse electrode terminals 62a, 62b into these rods. The nose and tail pieces have transverse openings to allow this assembly.

The inner cone electrode 12 is suspended within the outer cone electrode 14 as seen in FIGS. 1 and 2, creating the annular liquid flow passage 16. This annular flow passage should be uniform around the circumference of the inner cone 12, thus the accuracy of positioning of the inner cone within the outer cone is important. FIGS. 1 and 2 show that the terminal bars or cross pieces 62a and 62b are used to hold the inner cone 12 and its nose and tail pieces 50, 52 in place. The threads 64 between the terminal cross piece 62a and the rod 60a can provide for fine position adjustment along one axis, and the same is true at the tail piece 52, via the terminal cross bar 62b. The terminal cross bars 62a and 62b pass through slotted holes 65, 67 in the inflow/outflow conduits 40, 38. Mounting blocks 66a and 66b are placed against the cylindrical wall of the conduits 40, 38, and over the electrode terminals 62a, 62b. FIG. 3 shows nuts 69 assembled on the electrode terminal 62b, holding the tail piece 52 in place. These nuts are exemplary of all four locations. This assembly thus provides anchoring engagement with the exterior surfaces of the end inflow/outflow conduit members 40 and 38. The inner faces of the mounting blocks 66a, 66b may have annular O-ring channels 68 to allow sealing against the exterior surfaces of the conduits 40 and 38. The faces of the blocks 66a, 66b are cylindrically concave to match the shape of the conduit, as seen in FIG. 3.

FIG. 2 shows that at the smaller-diameter end of the assembly, the threaded terminal cross bar 62b may have a pair of spacers 70 positioned over the cross bar, engaging with the tail piece 52 and with the interior surface of the conduit 38. The spacers 70 can be a rigid plastic material such as PVC, preferably a hydrodynamic shape for flow in either direction. These spacers fit tightly within the space between the tail piece 52 and the conduit walls.

This support arrangement allows for the inner cone 12 to be adjusted slidingly in position relative to the outer cone 14. The slotted openings 65, 67 provide for axial adjustment movement of the inner cone 12 in the assembly, via change of position of the two terminal cross bars 62a, 62b within the slotted openings. A seal is maintained at each end, primarily by O-rings (not shown) fitted in the annular O-ring grooves 68 of the block members 66a, 66b.

The axial adjustment capability of the inner and outer cone relative to one another is an important feature of the invention. It is used to adjust the gap size of the annular flow channel 16 between the cones. FIGS. 1 and 2 show an example of a configuration of the cones wherein the inner cone 12 is adjusted essentially to the maximum position to the right relative to the outer cone 14. This provides the maximum flow gap 16 between the cones. Adjustment of inner cone by moving it to the left in these two figures will make the gap 16 smaller. This gap size adjustment is important because it can adjust the current density flowing through the aqueous liquid, per volume of liquid. For a given speed of movement through the device 10 (but not a given volumetric flow rate), the current density in electrolysis is increased as the gap is made smaller. When the conductivity of a liquid being treated is lower, the gap is made smaller, and vice versa.

The terminal cross bars 62a, 62b at the two ends of the electrolytic cell assembly 10 are both used to supply power to the inner electrode cone 12. The provision of terminals at both ends helps balance current flow and assures that current density is not biased toward one end of the inner electrode 12. For current flow through the outer electrode cone 14, the conductive flanges 35, 37 at ends of the outer cone have conductive tabs 73 extending radially outwardly, only a few being shown in FIGS. 1, 2 and 6. These can be affixed by welding; two to six may be desirable at each end, for connection to electrical power leads. The tabs or terminals 73 are spaced apart in the rotational direction to help distribute current flow relatively evenly through the outer electrode 14.

Figure 7:
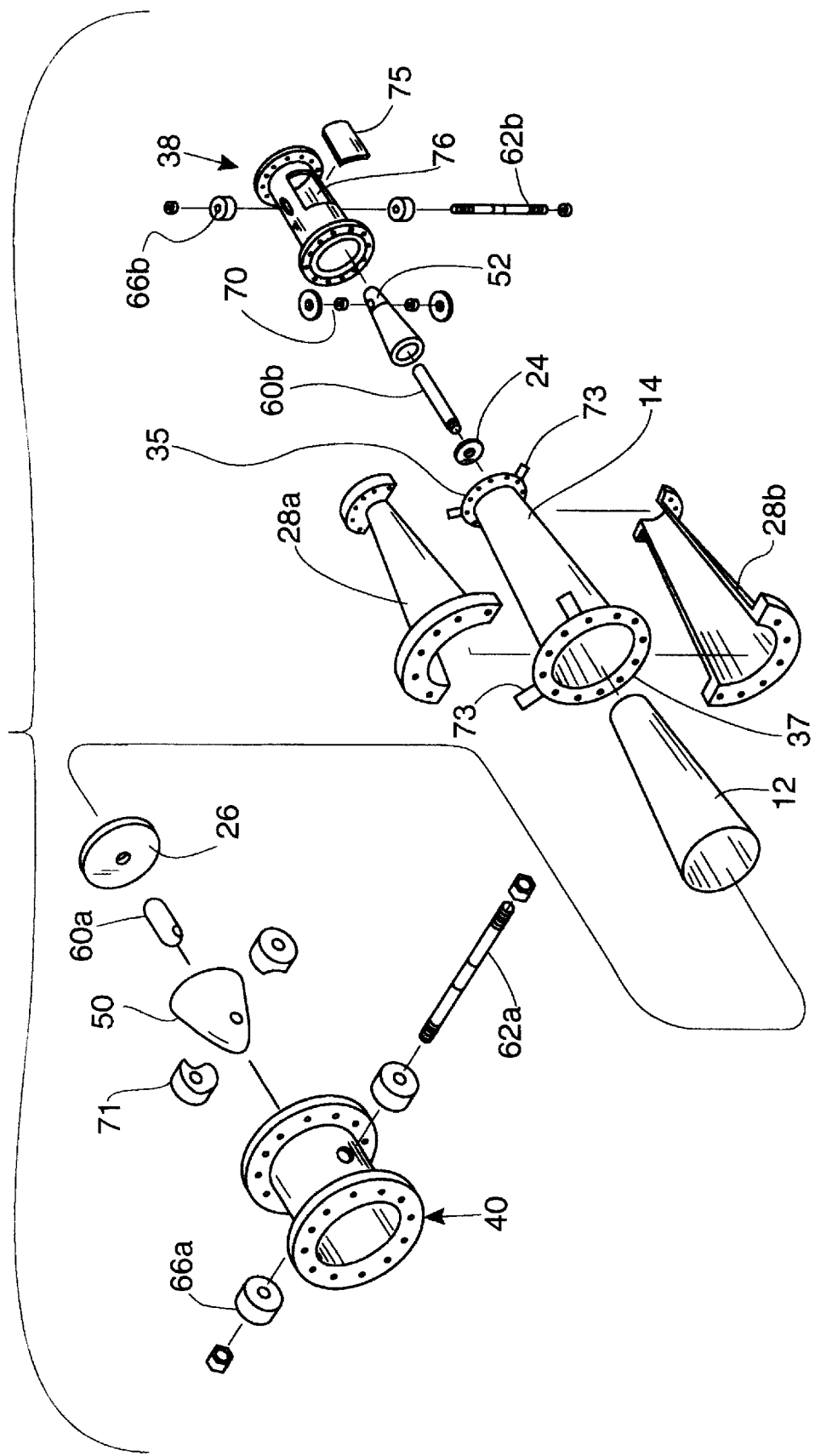
FIG. 7 is an exploded view in perspective indicating assembly of the device.

FIG. 7 shows a preferred embodiment of the assembly of the device 10 in exploded perspective. For assembly of the plastic jacket 28 over the outer electrode cone 14, the jacket 28 is formed preferably in two halves 28a and 28b as shown. The two halves are split essentially in the plane of the FIG. 2 drawing.

FIG. 7 shows the components which are assembled to produce the article illustrated in FIG. 6, as well as in sectional views of FIGS. 1 and 2. The inner cone 12 is shown without the closing ends 26 and 24, which are shown as disk-shaped components to be assembled to the conductor rods 60a and 60b. This can be by a threaded end and a nut securing the disks in place, or it can be by welding. In either event, the disks 26 and 24 are secured into the ends of the inner cone 12 by welding.

FIG. 7 shows spacer/locator pieces 71 for connection against opposed sides of the larger end cone 50. These are indicated in FIG. 2 but not shown in FIG. 1.

FIG. 7 also shows several examples of the radially extending terminal tabs 73, integral with or welded to the flange ends 37 and 35 of the larger cone. The plastic casing, i.e. the two casing halves 28a and 28b, are assembled onto the outer cone such that the end flanges 37 and 35 extend beyond the plastic casing, at each end, as shown in FIG. 6. FIG. 7 is somewhat schematic, not necessarily showing all components in correct proportion.

As FIG. 7 illustrates, one end of the electrolytic device can have an observation window 75 fixed and sealed in an opening 76 of the cylindrical inflow/outflow conduit 38.

The electrolytic device 10 illustrated may have approximately 2:1 ratio in size between the large end and the small end of the outer cone, in a cone length of about 14 inches. This produces a cone angle (from a center axis) of about 6°. Generally the cone angle should be kept between about 4° and 30°.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A device for electrolytic treatment of liquid flowing through the device, the device being capable of high flow efficiency, comprising:

a pair of metal cones comprising electrodes, including an outer cone and an inner cone, each having a common axis and being concentrically arranged with the inner cone positioned within the outer cone so as to define an annular flow space of increasing diameter from a first, smaller-diameter end of the device to a second, larger-diameter end of the device, such that liquid can flow through the annular space generally axially in either direction between the first and second ends, securing means for mounting the inner cone within the outer cone, the securing means including conductive terminal means providing a conductive electrical path to the inner metal cone electrode, and including a first exterior terminal for connection of a power lead, a second exterior terminal connected to the outer metal cone, and adjustment means associated with the securing means, for permitting adjustment of the inner metal cone relative to the outer metal cone by sliding movement along the axis of the two cones, to increase or decrease the size of the annular space between the two cones.

2. The device of claim 1, wherein the adjustment means comprises:

a tail extension on a smaller-diameter end of the inner cone, at the first end of the device, a first flow conduit secured to a smaller-diameter end of the outer cone, concentric with the outer cone and inner cone, at the first end of the device, slotted openings in the first flow conduit, through which opposed ends of the conductive terminal means extend, and gasket sealing means against the slotted openings for preventing leakage of liquid out through the slotted openings, and a nose extension on a larger-diameter end of the inner cone, at the second of the device and extending in a direction opposite the tail extension, a second flow conduit secured to a larger-diameter end of the outer cone in a sealed connection, and slotted openings in the second flow conduit, through which opposed ends of the conductive terminal means extend, and gasket sealing means against the slotted openings for preventing leakage of liquid out through the slotted openings, and providing for sliding axial adjustment of the position of the inner cone while maintaining the inner cone located on said axis, whereby the inner cone may be adjusted in axial position within the outer cone by manipulation of the conductive terminal means, providing for adjustment of the annular space between the inner and outer cones.

3. The device of claim 1, wherein at least one of the cones has a convoluted surface around the circumference of the surface, thereby increasing liquid surface contact area as the liquid flows through the device.

4. The device of claim 3, wherein both cones have said convoluted surfaces, and wherein the two convoluted surfaces are aligned such that the flow space defines a generally equidistant gap between the two surfaces around the circumference of the flow space.

5. The device of claim 1, wherein the adjustment means comprises flow conduits secured to both ends of the outer cone, nose and tail pieces on opposite ends of the inner cone, said conductive terminal means comprising rods secured to the nose and tail pieces and extending radially outwardly through slotted openings in the flow conduits at either end of the device, and means securing the rods against the exterior surfaces of the flow conduits in sealed relationship, such that the inner cone may be adjusted in axial position within the outer cone by manipulation of the conductive terminals, providing for adjustment of the annular space between the inner and outer cones.

6. The device of claim 1, including means for axial inflow and outflow at opposed ends of the device.

7. The device of claim 1, further including a plastic casing covering the outer cone, for rigidifying and insulating the outer cone.

8. The device of claim 7, further including a flow conduit at each end of the device, secured to the plastic casing and in sealed relationship with the outer cone.

9. The device of claim 8, wherein the plastic casing recovering the outer cone has end flanges at opposed ends of the device, and wherein the flow conduits have mating flanges, and including sealing means for sealing the flanges of the conduits against leakage between the outer cone and the flow conduits, and including fastener means securing the flanges of the flow conduits to the flanges of the casing to effect said sealing means.

10. The device of claim 9, wherein the outer cone has, at least at one end, a conductive metal flange extending radially outwardly, said conductive metal flange being positioned in sandwiched relationship between the flange of the plastic casing and the flange of the flow conduit, and the flange of the flow conduit being in sealed relationship against the conductive metal flange, said conductive metal flange having at least a portion extending radially outwardly beyond the plastic flanges of the casing and of the conduit, for connection to a power lead to connect current to the outer electrode.

11. The device of claim 10, wherein the outer cone has said conductive metal flanges at both ends.

12. The device of claim 1, wherein the metal cones are each formed of titanium.

13. The device of claim 1, wherein the inner cone has connected to it nose and tail pieces of hydrodynamic shape, tending to prevent turbulence of liquid flow in either direction as the liquid enters said annular space and exits said annular space, and including plastic flow conduits at either end of the device, connected in sealed relationship to the outer cone, and further including two conductive metal cross bars, one secured to each of the nose and tail pieces in transverse, radially extending relationship, and the two cross bars being generally perpendicular to each other, with means forming electrical connection between each cross bar and the inner metal cone, each of said cross bars passing through a respective flow conduit, with threaded fasteners at the end of the cross bars engaging against exterior surfaces of the flow conduits and thereby retaining the inner cone in position within the outer cone.

\* \* \* \* \*